(12) United States Patent
Suzuki

(10) Patent No.: US 7,257,148 B2
(45) Date of Patent: Aug. 14, 2007

(54) RADIO TRANSMITTING APPARATUS, RADIO RECEIVING APPARATUS, RADIO TRANSMITTING METHOD, AND RADIO RECEIVING METHOD

(75) Inventor: Mitsuhiro Suzuki, Chiba (JP)

(73) Assignee: Sony Corporation (JP)

( * ) Notice: Subject to any disclaimer, the term of this patent is extended or adjusted under 35 U.S.C. 154(b) by 715 days.

(21) Appl. No.: 10/138,101

(22) Filed: May 2, 2002

(65) Prior Publication Data
US 2004/0101033 A1 May 27, 2004

(30) Foreign Application Priority Data
May 8, 2001 (JP) ............................ P2001-177784

(51) Int. Cl.
*H04B 1/00* (2006.01)
(52) U.S. Cl. ...................................... 375/146; 375/147
(58) Field of Classification Search ................ 375/130, 375/135, 146, 238, 239, 259, 219, 289, 295, 375/147
See application file for complete search history.

(56) References Cited

U.S. PATENT DOCUMENTS

| | | | | |
|---|---|---|---|---|
| 4,809,249 A | * | 2/1989 | Barnes | 367/100 |
| 5,367,536 A | * | 11/1994 | Tsujimoto | 375/269 |
| 5,521,649 A | * | 5/1996 | Reime | 348/625 |
| 5,677,927 A | | 10/1997 | Fullerton et al. | 375/200 |
| 6,668,008 B1 | | 12/2003 | Panasik | 375/139 |
| 7,082,174 B1 | * | 7/2006 | Smee et al. | 375/349 |
| 2001/0053175 A1 | * | 12/2001 | Hoctor et al. | 375/130 |

FOREIGN PATENT DOCUMENTS

| | | |
|---|---|---|
| JP | 02-295213 | 12/1990 |
| JP | 06-053937 | 2/1994 |
| JP | 11-112463 | 4/1999 |

OTHER PUBLICATIONS

Mitchell Terry, "Broad is the way," IEEE Review, IEEE, Jan. 2001, vol. 47, Issue 1, pp. 35-39.

* cited by examiner

*Primary Examiner*—Chieh M. Fan
*Assistant Examiner*—Freshteh N Aghdam
(74) *Attorney, Agent, or Firm*—Lerner, David, Littenberg, Krumholz & Mentlik, LLP

(57) ABSTRACT

A spread code sequence generator generates a spread code sequence with the frequency of a synthesizer, and then outputs the spread code sequence to a multiplier. The multiplier outputs a spread signal obtained by multiplying a data sequence by the spread code sequence to an impulse generator. The impulse generator generates an impulse signal of very fine impulses that corresponds to 0s/1s of the spread signal. The impulse signal is outputted to a band pass filter, where a predetermined range of the impulse signal is extracted. The output of the band pass filter is fed to a subtracter and a delay circuit. The delay circuit delays the delayed signal by a predetermined period. The delayed signal is outputted to the subtracter. The subtracter subtracts the delayed signal from the output of the band pass filter. A signal obtained by such subtraction processing is transmitted as a transmission signal via an antenna.

11 Claims, 9 Drawing Sheets

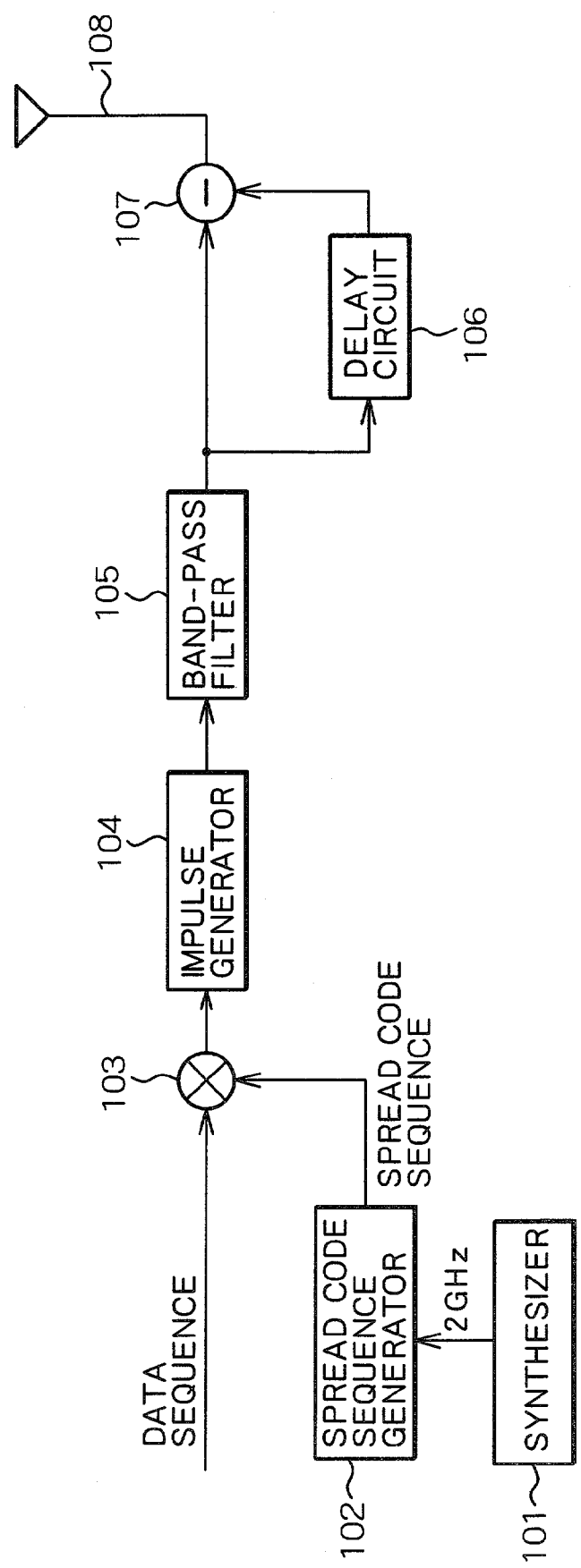
F I G. 1

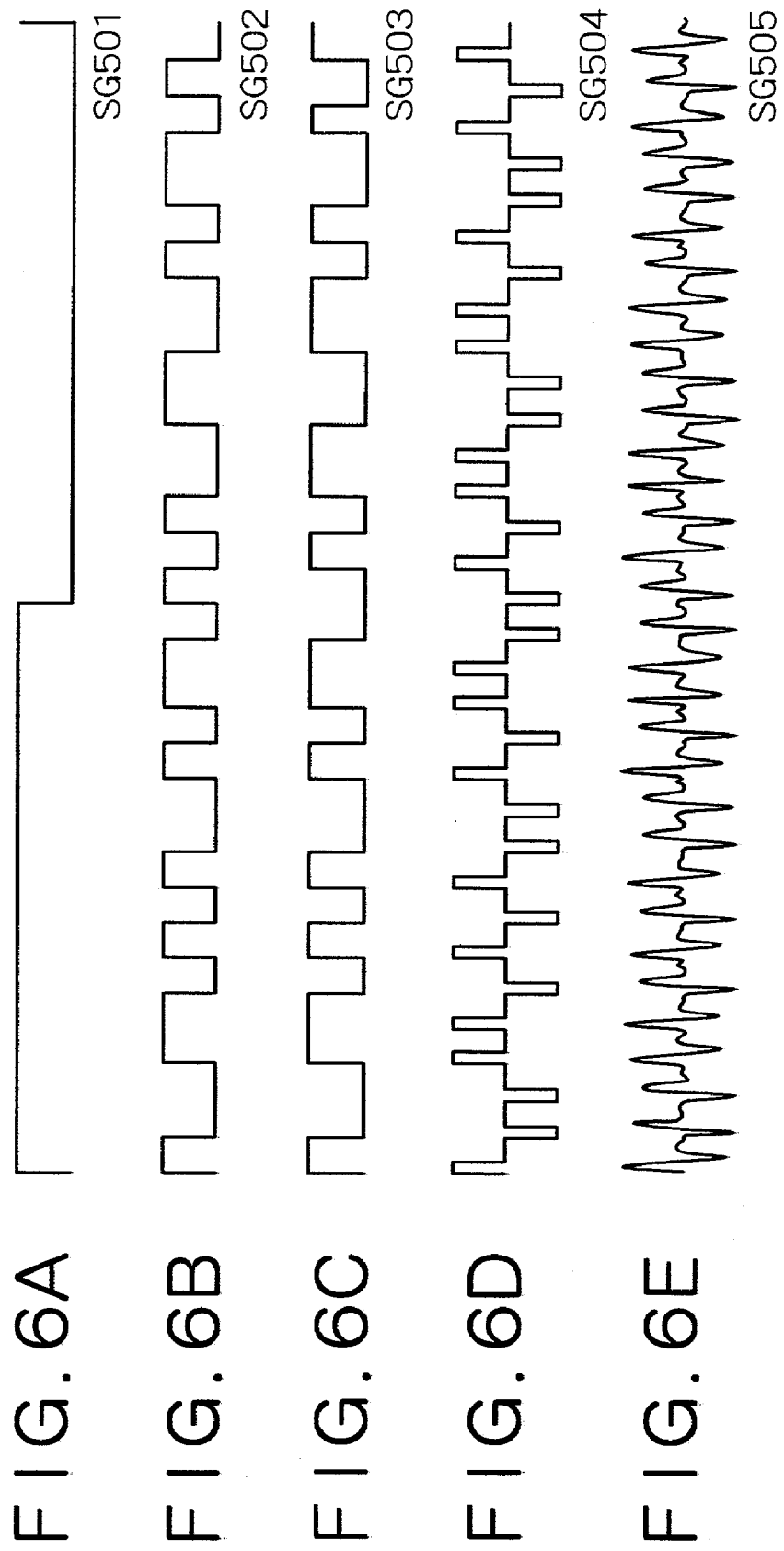

RADIO TRANSMITTING APPARATUS, RADIO RECEIVING APPARATUS, RADIO TRANSMITTING METHOD, AND RADIO RECEIVING METHOD

BACKGROUND OF THE INVENTION

The present invention relates to a radio transmitting apparatus and a radio receiving apparatus used in a digital radio communication system.

With the recent spread of mobile communication apparatus such as portable telephones and pages, there has been an explosive increase in the number of users of such mobile communication apparatus. On the other hand, there is a limit to frequency resources available to radio communication, and therefore it is becoming extremely difficult to allocate a frequency band not used by existing radio systems when introducing a new radio communication system.

As new radio technology that enables effective use of frequency resources to deal with such a situation, an ultra wide band (UWB) transmission system has recently been drawing attention. Basically, the ultra wide band transmission system makes baseband transmission using a signal formed of a pulse train having a very small pulse width (for example 1 ns (nanosecond) or less). A bandwidth occupied by the ultra wide band transmission system is a bandwidth on the order of GHz such that a value obtained by dividing the occupied bandwidth by a central frequency (for example 1 GHz to 10 GHz) of the occupied bandwidth is substantially one. The bandwidth is extremely wide as compared with bandwidths used by the so-called W-CDMA system and cdma2000 system, and wireless LANs using SS (Spread Spectrum) and OFDM (Orthogonal Frequency Division Multiplexing).

In addition, the ultra wide band transmission system has a characteristic of low signal power density, and thus has an advantage in that the ultra wide band transmission method does not readily cause interference with another radio system. The ultra wide band transmission system is therefore expected to become a technology whose band can be overlaid on frequency bands used by existing radio systems. Furthermore, because of its wide band, the ultra wide band transmission system is considered to be promising as an ultrahigh-speed radio transmission technology at a level of 100 Mbps for application to a personal area network (PAN).

The ultra wide band (UWB) radio transmission has a characteristic of low signal power density, and thus has an advantage in that the ultra wide band radio transmission does not readily undergo or cause interference. Furthermore, because of its wide band, the ultra wide band radio transmission is considered to be promising as an ultrahigh-speed radio transmission technology at a level of 100 Mbps for application to a personal area network (PAN).

As a modulation system used in the ultra wide band transmission system, there is pulse position modulation (PPM) that uses a signal obtained by slightly shifting the timing of pulse generation forward and backward to express 0/1 information, as described in Japanese Translation of PCT for Patent No. Hei 10-508725 and U.S. Pat. No. 6,026,125, for example. In addition, as another modulation system, bi-phase modulation that expresses 0/1 information by changes in the phase of pulses has been proposed.

Supposing that a transmitting apparatus and a receiving apparatus of the ultra wide band transmission system using the above bi-phase modulation are formed using a pulse generator, the following configurations may be considered, for example.

FIG. 5 is a block diagram showing a configuration of a transmitting apparatus using such an ultra wide band transmission system. FIGS. 6A, 6B, 6C, 6D, and 6E are diagrams showing signal waveforms in parts of the transmitting apparatus shown in FIG. 5. FIGS. 7A, 7B, 7C, and 7D are diagrams showing signal spectra in the transmitting apparatus shown in FIG. 5.

A spread code sequence generator 502 generates a spread code sequence SG502 (FIG. 6B) with the frequency of a synthesizer 501, and then outputs the spread code sequence SG502 to a multiplier 503. The multiplier 503 multiplies a data sequence SG501 (FIG. 6A and FIG. 7A) by the spread code sequence SG502 to form a spread signal SG503 (FIG. 6C and FIG. 7B), and outputs the spread signal SG503 to an impulse generator 504.

The impulse generator 504 generates an impulse signal SG504 (FIG. 6D and FIG. 7C) of very fine impulses of 100 ps, for example, which signal corresponds to 0s/1s of the spread signal SG503. The impulse signal SG504 is outputted to a band-pass filter 505, where a predetermined range, for example a range of 3.0 to 5.0 GHz of the impulse signal SG504 is extracted. The impulse signal SG504 is thereby converted into a transmission signal SG505 (FIG. 6E and FIG. 7D), and then transmitted as SG505 via an antenna 506.

FIG. 8 is a block diagram showing a configuration of a receiving apparatus using the ultra wide band transmission system. FIG. 9 is a diagram showing correlation characteristics in main parts of a timing synchronization circuit having a configuration of a so-called DLL (Delay Lock Loop) in the receiving apparatus shown in FIG. 8.

A radio signal is received by an antenna 801. A band-pass filter 802 removes an undesired component from the received signal, and then outputs the resulting received signal to multipliers 803, 805, and 807.

A spread code sequence generator 811 generates a spread code sequence (spread code sequence identical with the spread code sequence used in the transmitting apparatus shown in FIG. 5) with the frequency of a synthesizer 815, and then outputs the spread code sequence to an impulse generator 812. The impulse generator 812 generates impulses, superimposes the spread code sequence outputted from the spread code sequence generator 811 on the impulses, and then outputs the result to delay circuits 813, 814 and the multiplier 807.

The delay circuit 814 delays the impulses having the spread code sequence superimposed thereon by a ½ pulse width, and then outputs the result to the multiplier 803. The delay circuit 813 delays the impulses having the spread code sequence superimposed thereon by one pulse width, and then outputs the result to the multiplier 805.

Hence, the multiplier 803 multiplies the received signal by the impulses having the spread code sequence superimposed thereon for demodulating transmitted data, to thereby perform despreading processing. The multiplier 807 multiplies the received signal by the impulses having the spread code sequence superimposed thereon in timing a ½ pulse width ahead of the output of the delay circuit 814, to thereby perform despreading processing. The multiplier 805 multiplies the received signal by the impulses having the spread code sequence superimposed thereon in timing a ½ pulse width behind the output of the delay circuit 814, to thereby perform despreading processing.

A result of the multiplication of the multiplier 803 is outputted to an integrator 804, integrated by the integrator 804, and then outputted as received data. A result of the multiplication of the multiplier 805 is outputted to an integrator 806, integrated by the integrator 806, and then outputted to a difference unit 809 (902 in FIG. 9). A result of the multiplication of the multiplier 807 is outputted to an integrator 808, integrated by the integrator 808, and then outputted to the difference unit 809 (901 in FIG. 9).

The difference unit 809 obtains a difference (903 in FIG. 9: solid line) between the output of the integrator 806 and the output of the integrator 808, and then outputs the difference to a loop filter 810. As is understood from FIG. 9, the output (axis of ordinates) linearly responds to phase displacement (axis of abscissas). Specifically, the output has a characteristic showing an S-shaped curve based on a reception timing offset.

Thus, an output (difference) obtained by filtering the difference by the loop filter 810 is fed back to the synthesizer 815. When the characteristic shown in FIG. 9 indicates no reception timing offset, for example, a zero is outputted; when reception timing is offset forward or backward, a positive or negative value is outputted as a timing offset signal. Such a circuit is referred to as a timing synchronization circuit (DLL: Delay Lock Loop).

The synthesizer 815 effects control such that when the output of the loop filter 810 is positive, the phase of the spread code sequence being generated is delayed slightly, and when the output of the loop filter 810 is negative, the phase of the spread code sequence being generated is advanced slightly. Thus, the output (difference) of the loop filter 810 becomes zero, and the spread code sequence and pulses having the received signal superimposed thereon supplied to the multiplier 803 are brought in phase with each other, whereby the despread output of the multiplier 803 is maximized.

However, the ultra wide band (UWB) radio transmission uses a frequency band of 3 GHz to 6 GHz. Although the ultra wide band (UWB) radio transmission does not use a frequency band of 2 GHz and lower, which band is used by many other systems, a wireless LAN system such as IEEE 802.11a uses 5 GHz. Even in an application to PAN, the frequencies used by the ultra wide band (UWB) radio transmission and the wireless LAN system conflict with each other in the same area, and therefore the ultra wide band (UWB) radio transmission and the wireless LAN system cause interference with each other or undergo interference from each other.

Because of its ultra wide band, the UWB radio transmission undergoes a considerably low level of interference. Supposing that the other system is used in substantially the same area, when a transmitter of the 5-GHz wireless LAN system is situated in the close vicinity of a UWB receiver or when a UWB transmitter is situated in the close vicinity of a receiver of the 5-GHz wireless LAN system, the level of interference may exceed a tolerable range, thereby greatly degrade receiving quality and render reception impossible.

As a method for solving this problem, there is WO01/93445 (applicant: XTREMESPECTRUM). According to this invention, when presence of another narrow-band system (ex. 5 GHz wireless LAN) is detected, the band is removed by using a filter circuit. However, the method has a problem in that the structure of the removal filter is complex. In addition, only the structure of a receiver for removing interference received from another system is disclosed, and no consideration is given from a viewpoint of preventing the causing of interference with the other system.

SUMMARY OF THE INVENTION

It is accordingly an object of the present invention to provide a radio transmitting apparatus and a radio receiving apparatus that can be prevented from causing and undergoing interference even when another system is used in the same area or an adjacent area.

According to the present invention, there is provided a radio transmitting apparatus including: spreading means for subjecting data to be transmitted to spectrum spreading modulation processing using a spread code sequence, and thereby obtaining a spread signal; impulse generating means for generating an impulse signal corresponding to the spread signal; delaying means for delaying the impulse signal by a time equal to a reciprocal of a frequency that has a possibility of causing interference; subtracting means for subjecting the delayed impulse signal and the impulse signal to subtraction processing; and transmitting means for transmitting a signal after the subtraction processing.

According to the present invention, there is provided a radio receiving apparatus including: receiving means for receiving a radio signal; delaying means for delaying the received signal by a time equal to a reciprocal of a frequency that has a possibility of undergoing interference; subtracting means for subjecting the delayed received signal and the received signal to subtraction processing; spread code generating means for generating a spread code sequence; impulse generating means for generating an impulse signal corresponding to the spread code sequence; and despreading means for performing despreading processing by multiplying a signal after the subtraction processing by the impulse signal, and thereby obtaining received data.

The apparatus thus configured delay the impulse signal by a time equal to a reciprocal of a frequency that may cause or undergo interference, and subject the delayed signal and the original signal to subtraction processing. It is therefore possible to attenuate a signal of the frequency used by another system. Thus, it is possible to prevent the causing and undergoing of interference even when another system is used in the same area or an adjacent area.

One preferred embodiment of the present invention is characterized in that the frequency is about 5 GHz. "About 5 GHz" refers to a range in the vicinity of 5 GHz including the 5 GHz.

BRIEF DESCRIPTION OF THE DRAWINGS

FIG. 1 is a block diagram showing a configuration of a radio transmitting apparatus using a spread spectrum communication system according to an embodiment of the present invention;

FIGS. 6A, 6B, 6C, 6D, and 6E are diagrams showing signals in the transmitting apparatus shown in FIG. 5;

DETAILED DESCRIPTION OF PREFERRED EMBODIMENTS

Preferred embodiments of the present invention will hereinafter be described in detail with reference to the accompanying drawings.

Figure 2A:
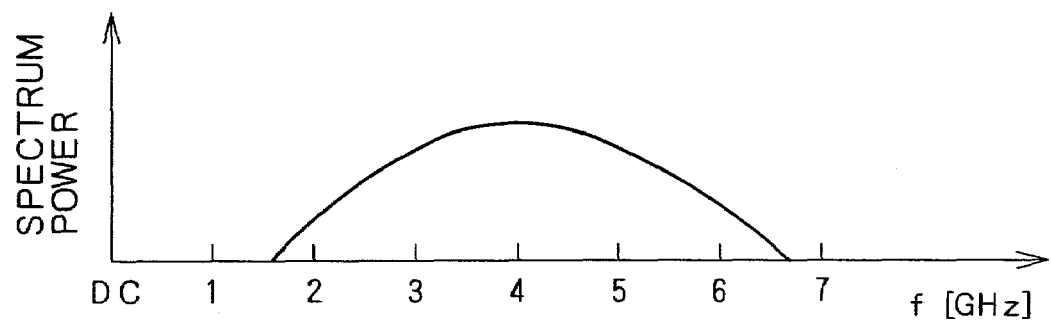
FIGS. 2A and 2B are diagrams showing signals in the radio transmitting apparatus shown in FIG. 1.
Figure 2B:
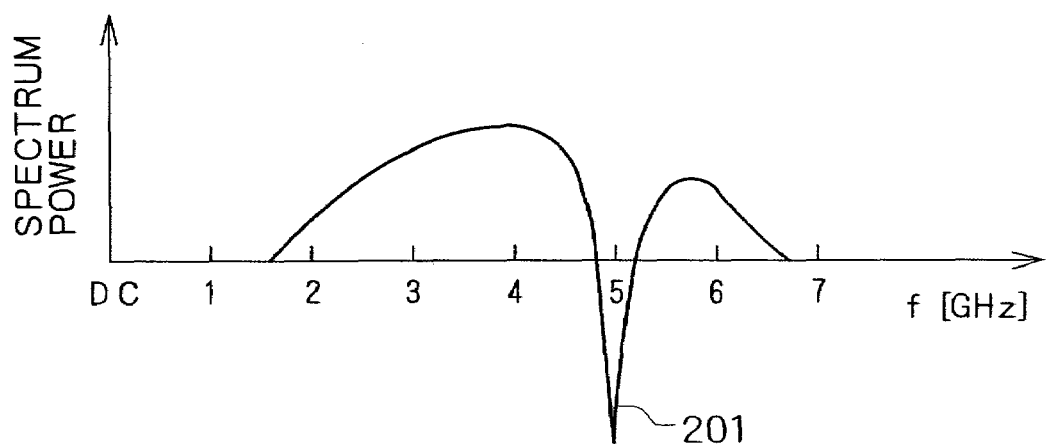

FIG. 1 is a block diagram showing a configuration of a radio transmitting apparatus using a spread spectrum communication system according to an embodiment of the present invention. FIGS. 2A and 2B are diagrams showing signal spectra in parts of the radio transmitting apparatus shown in FIG. 1.

The radio transmitting apparatus shown in FIG. 1 includes a spread code sequence generator 102 for generating a spread code sequence with a frequency of a synthesizer 101 serving as an oscillator, a multiplier 103 for multiplying a data sequence by the spread code sequence, an impulse generator 104 for generating an impulse signal corresponding to 0 s/1 s of a spread signal obtained by multiplying the data sequence by the spread code sequence, a band-pass filter 105 for extracting a predetermined range of the impulse signal, a delay circuit 106 for delaying an output of the band-pass filter 105, a subtracter 107 for obtaining a difference between the output of the band-pass filter 105 and an output of the delay circuit 106, and an antenna 108 for transmitting the addition signal.

Operation of the radio transmitting apparatus having the above configuration will be described. In the following, description will be made of a case where another system uses a 5-GHz frequency band, and accordingly a transmitting signal is delayed by 1/5 GHz=200 ps.

The spread code sequence generator 102 generates a spread code sequence with the frequency of the synthesizer 101, and then outputs the spread code sequence to the multiplier 103. The multiplier 103 multiplies a data sequence by the spread code sequence to form a spread signal, and outputs the spread signal to the impulse generator 104.

The impulse generator 104 generates an impulse signal of very fine impulses of 100 ps, for example, which signal corresponds to 0s/1s of the spread signal. The impulse signal is outputted to the band-pass filter 105, where a predetermined range, for example a range of 3.0 to 5.0 GHz of the impulse signal is extracted. The output of the band-pass filter is outputted to the subtracter 107 and the delay circuit 106. It is to be noted, however, that the band-pass filter 105 is not an essential component in the present invention.

The delay circuit 106 delays the output of the band-pass filter by 1/5 GHz=200 ps. The delayed signal is outputted to the subtracter 107. The subtracter 107 subtracts the signal obtained by delaying the output of the band-pass filter from the output of the band-pass filter. A signal obtained by such subtraction processing is transmitted as a transmission signal via the antenna 108.

Specifically, the subtracter 107 converts the output spectrum of the band-pass filter as shown in FIG. 2A into a signal spectrum as shown in FIG. 2B by the subtraction processing. More specifically, the delaying of the output of the band-pass filter by 1/5 GHz=200 ps for subtraction means addition of the delayed output opposite in phase, or different in phase by 180° with respect to the output of the band-pass filter around 5 GHz. Hence, an attenuated portion 201 in FIG. 2B results. Even if a receiver in a system using 5 GHz receives such a signal, the signal does not interfere with its reception because of the presence of the attenuated portion 201. The delay circuit 106 can be formed by using a delay circuit in an IC.

Figure 3:
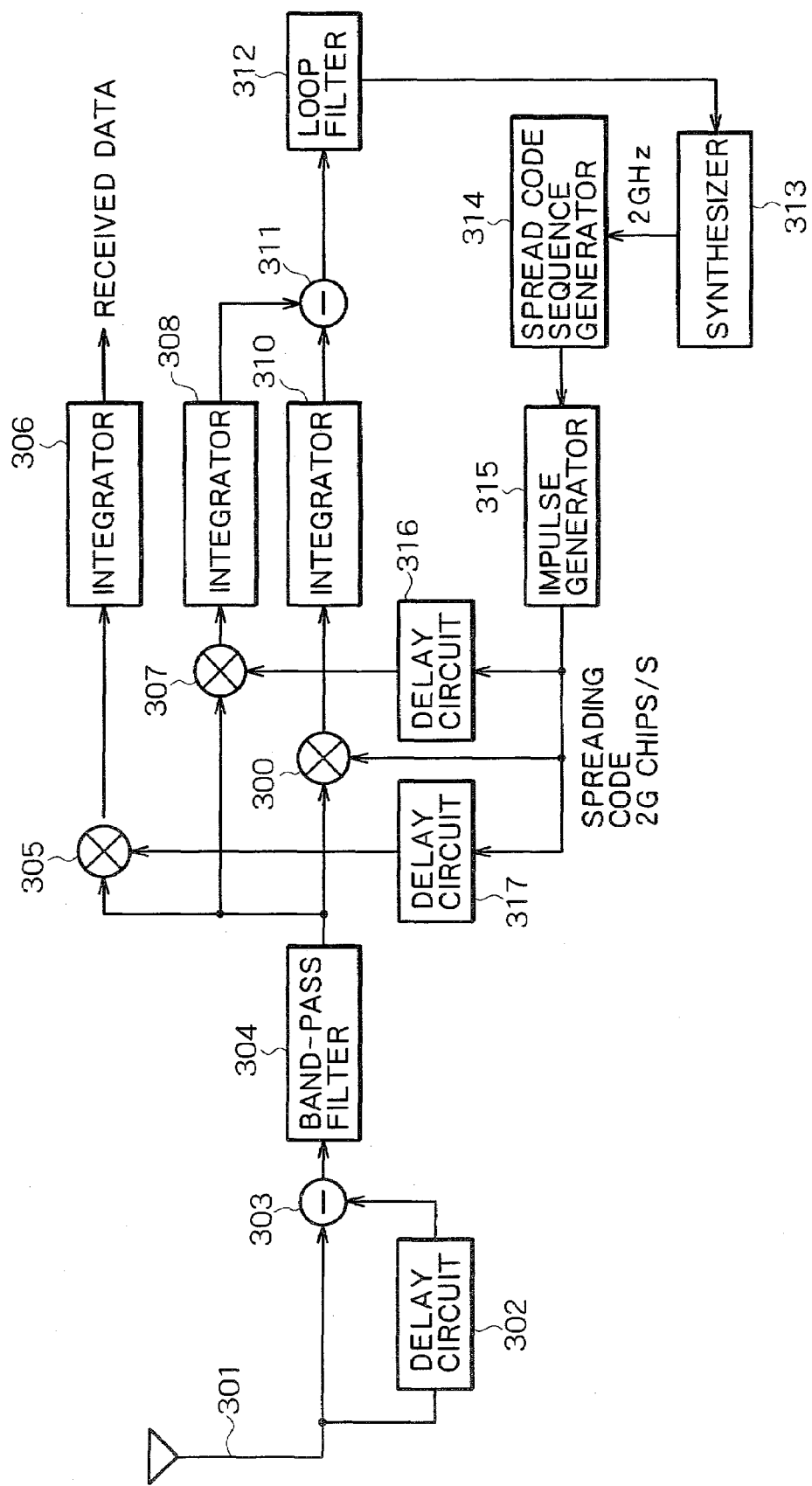
FIG. 3 is a block diagram showing a configuration of a radio receiving apparatus using a spread spectrum communication system according to an embodiment of the present invention.
Figure 4A:
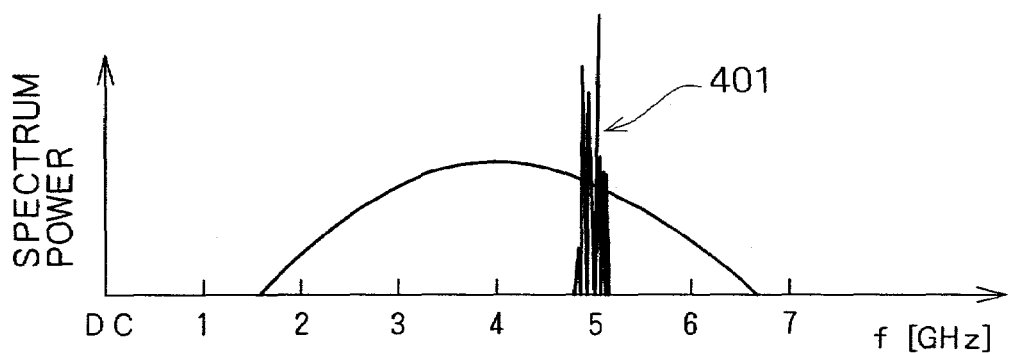
FIGS. 4A and 4B are diagrams showing signals in the radio receiving apparatus shown in FIG. 3.
Figure 4B:
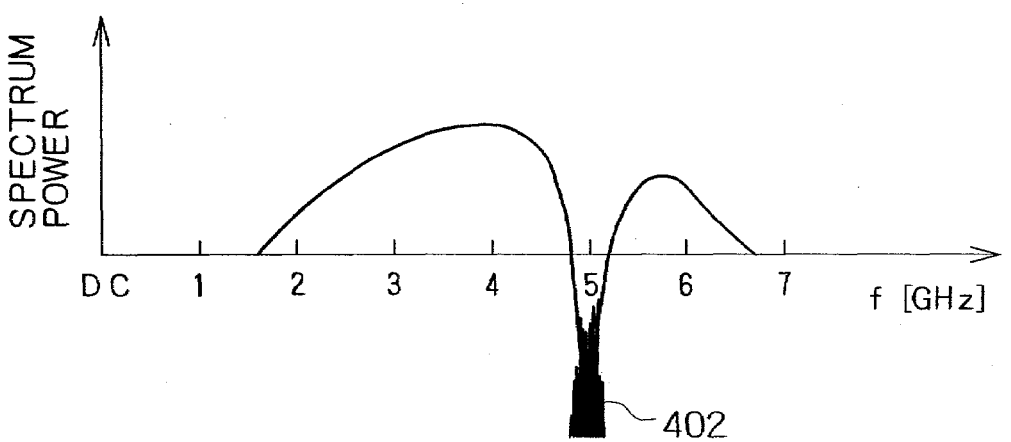
Figure 5:
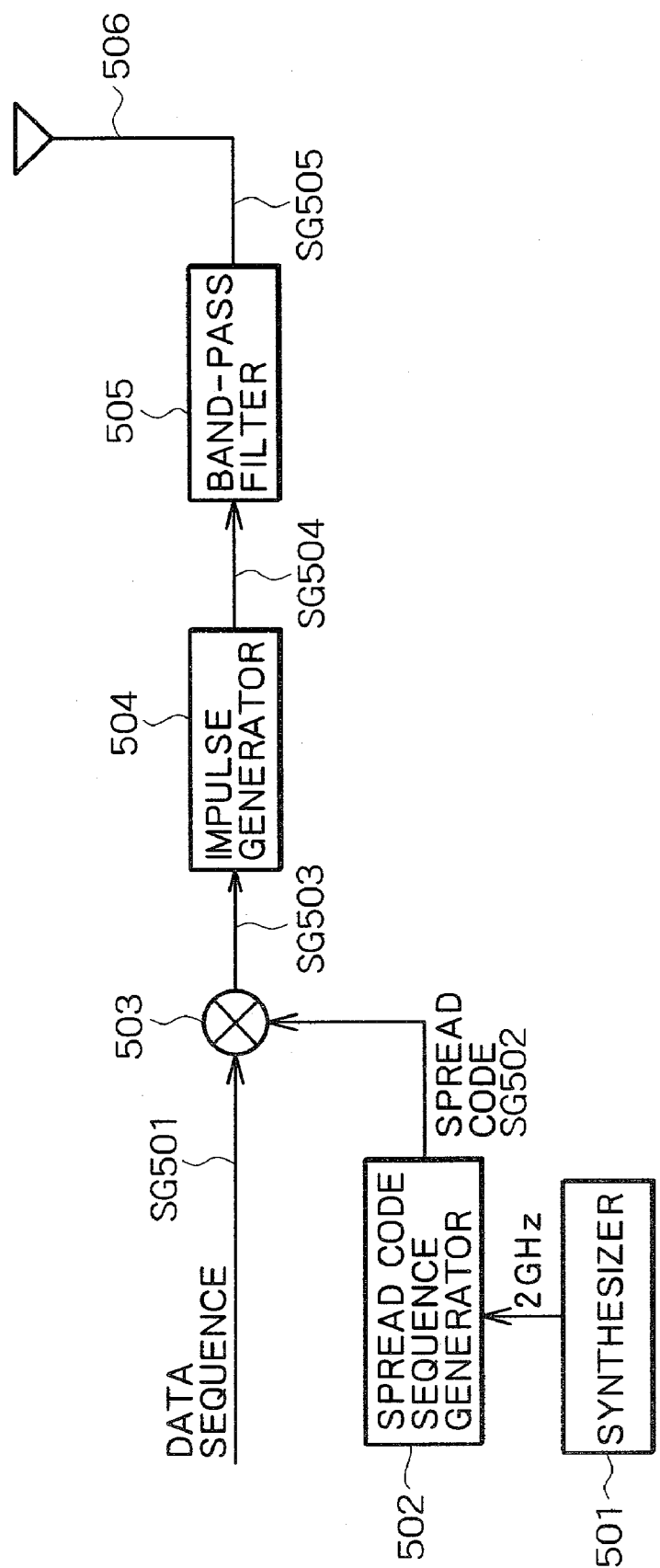
FIG. 5 is a block diagram showing a configuration of a conventional transmitting apparatus using a spread spectrum communication system.
Figure 7A:
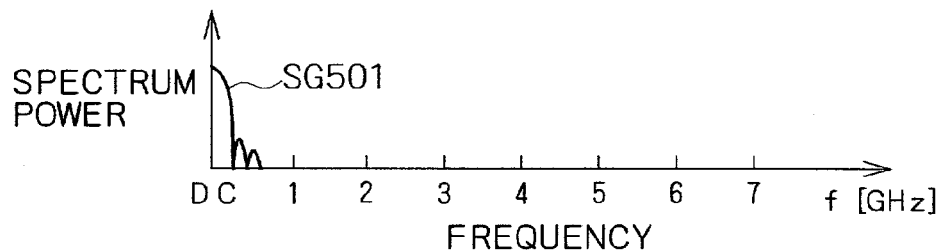
FIGS. 7A, 7B, 7C, and 7D are diagrams showing signal waveforms in the transmitting apparatus shown in FIG. 5.
Figure 7B:
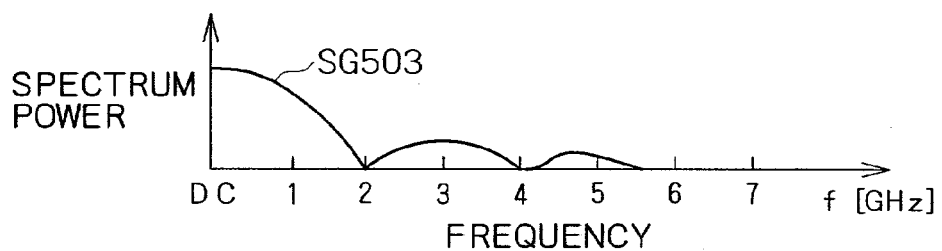
Figure 7C:
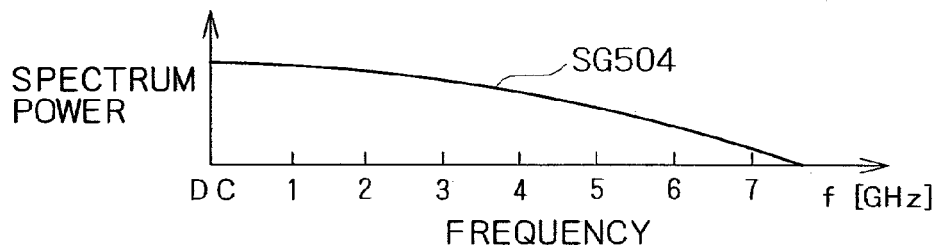
Figure 7D:
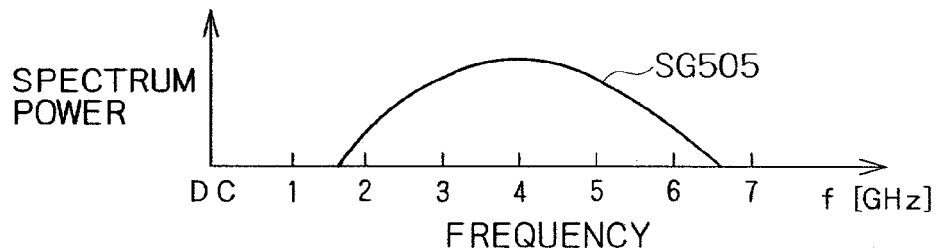
Figure 8:
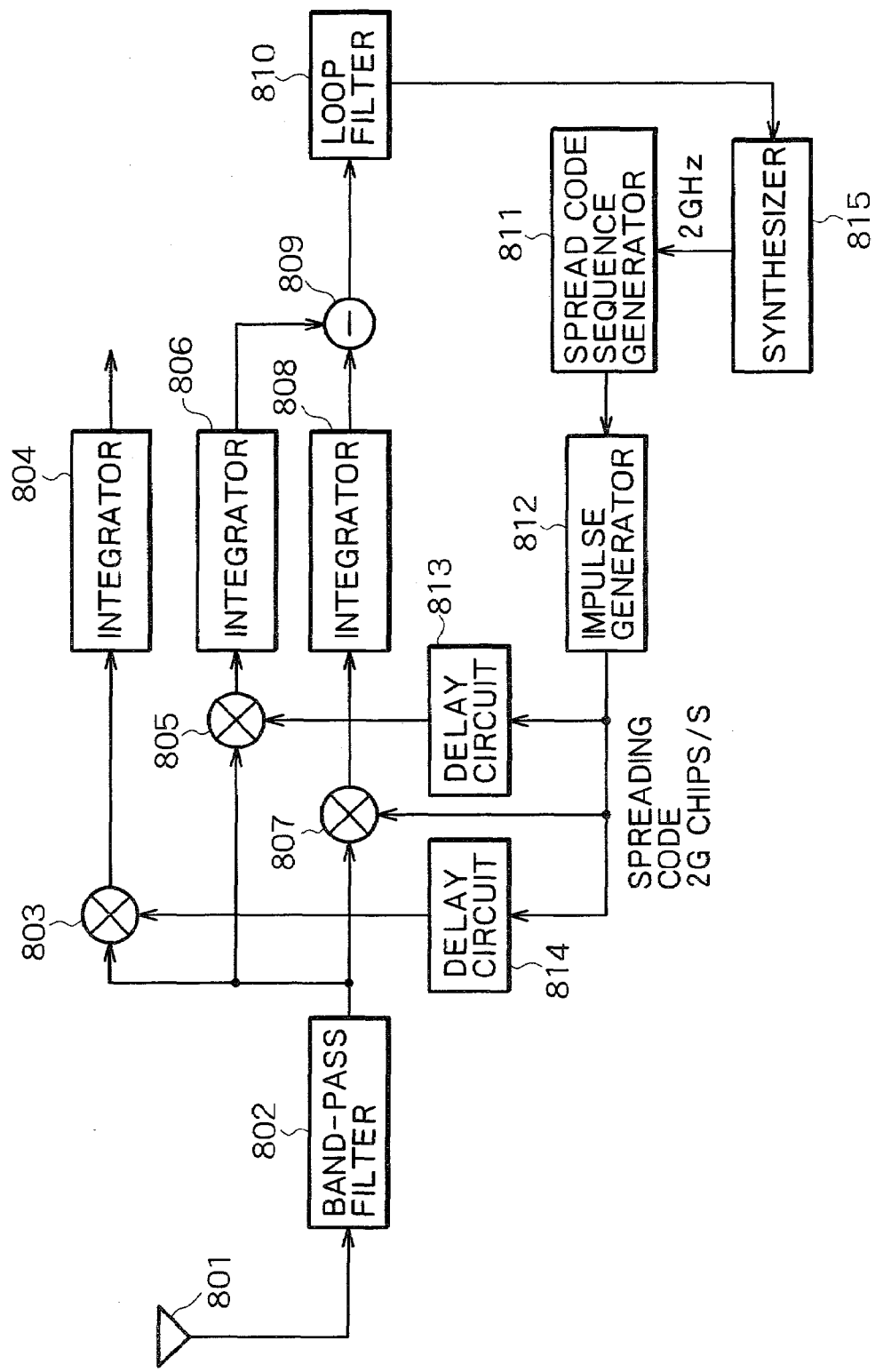
FIG. 8 is a block diagram showing a configuration of a conventional receiving apparatus using a spread spectrum communication system.
Figure 9:
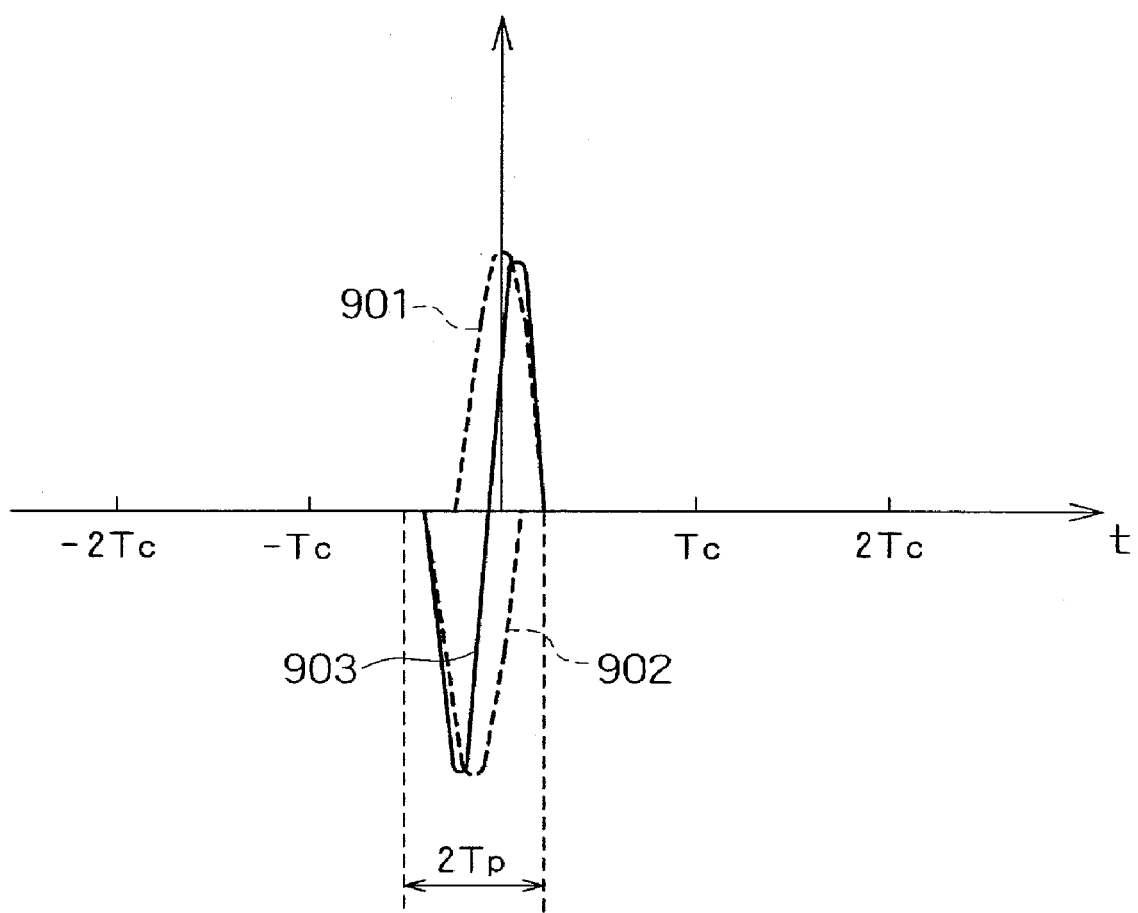
FIG. 9 is a diagram showing correlation characteristics in the receiving apparatus shown in FIG. 8.

FIG. 3 is a block diagram showing a configuration of a radio receiving apparatus using a spread spectrum communication system according to an embodiment of the present invention. FIGS. 4A and 4B are diagrams showing signal spectra in parts of the radio receiving apparatus shown in FIG. 3.

A radio signal is received by an antenna 301. The received signal is supplied to a delay circuit 302 and also supplied to a subtracter 303. The delay circuit 302 delays the received signal by 1/5 GHz=200 ps, and then outputs the delayed received signal to the subtracter 303. The subtracter 303 subjects the received signal and the delayed received signal to subtraction processing.

As shown in FIG. 4A, the received signal includes a signal of another system around 5 GHz as interference 401. The delaying of such a received signal by 1/5 GHz=200 ps for subtraction means addition of the delayed received signal opposite in phase, or different in phase by 180° with respect to the received signal around 5 GHz. Hence, an attenuated portion 402 in FIG. 4B results. Thus, even if the radio receiving apparatus receives a high-level signal transmitted by another system using 5 GHz, the signal does not interfere with the reception of the radio receiving apparatus.

A band-pass filter 304 removes an undesired component from a signal after the subtraction processing, and then outputs the signal to multipliers 305, 307, and 309. It is to be noted, however, that the band-pass filter 304 is not an essential component in the present invention. A spread code sequence generator 314 generates a spread code sequence (spread code sequence identical with the spread code sequence used in the radio transmitting apparatus shown in FIG. 1) with the frequency of a synthesizer 313, and then outputs the spread code sequence to an impulse generator 315. The impulse generator 315 generates impulses, superimposes the spread code sequence outputted from the spread code sequence generator 314 on the impulses, and then outputs the result to delay circuits 316 and 317 and the multiplier 309.

The delay circuit 317 delays the impulses having the spread code sequence superimposed thereon by a 1/2 pulse width, and then outputs the result to the multiplier 305. The delay circuit 316 delays the impulses having the spread code sequence superimposed thereon by one pulse width, and then outputs the result to the multiplier 307.

Hence, the multiplier 305 multiplies the received signal by the impulses having the spread code sequence superimposed thereon and eventually synchronized for demodulating transmitted data, to thereby perform despreading processing. The multiplier 309 multiplies the received signal by the impulses having the spread code sequence superimposed thereon in timing a 1/2 chip period ahead of the spread code sequence supplied to the multiplier 305, to thereby perform despreading processing. The multiplier 307 multiplies the received signal by the impulses having the spread code sequence superimposed thereon in timing a 1/2 chip period behind the spread code sequence supplied to the multiplier 305, to thereby perform despreading processing.

A result of the multiplication of the multiplier 305 is outputted to an integrator 306, integrated by the integrator 306, and then outputted as received data. A result of the multiplication of the multiplier 307 is outputted to an integrator 308, integrated over an interval of a data bit by the integrator 308, and then outputted to a difference unit 311. A result of the multiplication of the multiplier 309 is outputted to an integrator 310, integrated by the integrator 310, and then outputted to the difference unit 311.

The difference unit 311 obtains a difference between the output of the integrator 308 and the output of the integrator 310, and then outputs the difference to a loop filter 312. An output (difference) obtained by filtering the difference by the loop filter 312 is fed back to the synthesizer 313. When there is no reception timing offset, a zero is outputted; when reception timing is offset forward or backward, a positive or negative value is outputted as a timing offset signal.

The synthesizer 313 controls an oscillating signal such that when the output of the loop filter 312 is positive, the phase of the spread code sequence being generated is delayed slightly, and when the output of the loop filter 312 is negative, the phase of the spread code sequence being generated is advanced slightly. Thus, when proper timing is achieved, the output (difference) of the loop filter 312 is zero, and the spread code sequence and the received signal are in phase with each other, whereby the despread output of the multiplier 305 is maximized and the transmitted data is demodulated in a state in which timing synchronization is achieved.

As described above, the present embodiments delay an impulse signal by a time equal to a reciprocal of a frequency that may cause or undergo interference, and subject the delayed signal and the original signal to subtraction processing. It is therefore possible to attenuate a signal of the frequency used by another system. Thus, it is possible to prevent the causing and undergoing of interference even when another system is used in the same area or an adjacent area.

The configurations described above are readily applicable to radio transmitting apparatus and radio receiving apparatus for UWB radio transmission, and can be realized by a simple circuit. Furthermore, in this case, effects of addition of the circuits on transmission and reception characteristics of the apparatus for UWB radio transmission can be controlled to a low level.

The present invention is not limited to the foregoing embodiments, and is susceptible of various changes for embodiment. For example, the frequency and the chip rate in the above embodiments are not limited specifically to those of the above embodiments, and are susceptible of various changes for embodiment.

In addition, while the above embodiments have been described by taking a case where a multiplier is used in modulating the spread code sequence with the transmitting signal, an EX-OR circuit rather than the multiplier may be used in the present invention.

Furthermore, while the above embodiments have been described by taking a case where another system uses 5 GHz and a delay of ⅕ GHz is provided, the present invention is not particularly limited in terms of a frequency band because the present invention can be realized by providing a delay of a time equal to a reciprocal of a frequency of a band used by another system.

As described above, the radio transmitting apparatus and the radio receiving apparatus according to the present invention delay an impulse signal by a time equal to a reciprocal of a frequency that may cause or undergo interference, and subject the delayed signal and the original signal to subtraction processing. It is therefore possible to attenuate a signal of the frequency used by another system. Thus, it is possible to prevent the causing and undergoing of interference even when another system is used in the same area or an adjacent area.

While the preferred embodiments of the present invention have been described using the specific terms, such description is for illustrative purposes only, and it is to be understood that changes and variations may be made without departing from the spirit or scope of the following claims.

What is claimed is:

1. A radio system using an impulse signal sequence for reducing narrowband interference at a frequency f caused by another radio transmitting apparatus in another radio system, the system comprising:
   an impulse signal generator for generating an impulse signal based on a spread signal obtained by multiplying a data sequence by a spread code sequence;
   a delay circuit for delaying the impulse signal by a predetermined time based on a reciprocal of the frequency f from said another radio transmitting apparatus;
   a subtractor, wherein a subtraction signal is generated by subtracting a delayed signal from said delay circuit generated by delaying the impulse signal formed by the impulse signal sequence by 1/f second from the impulse signal from the impulse signal generator, and the subtraction signal is transmitted as a radio signal such that the frequency f of the transmitted radio signal is attenuated sufficiently to avoid interference with a signal transmitted by said another radio transmitting apparatus; and
   a receiver for receiving the radio signal, the receiver having a receive delay circuit for delaying the radio signal by 1/f to produce a delayed radio signal, and a receive subtraction circuit for adding an opposite phase radio signal to the delayed radio signal.

2. The radio system as claimed in claim 1, wherein said frequency f is substantially equal to 5 GHz.

3. The radio system as claimed in claim 1, wherein said delay is provided by a delay circuit.

4. The radio system as claimed in claim 1, wherein said radio transmitting apparatus using said impulse signal sequence is a radio transmitting apparatus using ultrawideband communication.

5. A radio system comprising:
   spreading means for subjecting data to be transmitted to spectrum spreading modulation processing using a spread code sequence and producing thereby a spread signal;
   impulse generating means for generating an impulse signal corresponding to said spread signal;
   delaying means for delaying said impulse signal by a time equal to a reciprocal of a frequency f of a signal from another radio transmitting apparatus that can cause interference in a signal transmitted by the radio transmitting apparatus;
   subtracting means for subjecting the delayed impulse signal and said impulse signal to subtraction processing and producing an output signal;
   transmitting means for transmitting the output signal after the subtraction processing, wherein the frequency f of the transmitted output signal is attenuated sufficiently to avoid interference with a signal transmitted by said another radio transmitting apparatus; and
   a receiver for receiving the radio signal, the receiver having a receive delay circuit for delaying the radio signal by 1/f to produce a delayed radio signal, and a receive subtraction circuit for adding an opposite phase radio signal to the delayed radio signal.

6. A method for transmitting a radio signal over a first radio transmission system using an impulse signal sequence for reducing narrowband interference caused by interference with a signal at a frequency f produced by a second radio transmitting system, the method comprising:

generating a delayed signal by delaying a signal formed of the impulse signal sequence by 1/f second;

generating a subtraction signal by subtracting said delayed signal from the signal formed of the impulse signal sequence;

transmitting the subtraction signal wherein the frequency f of the transmitted signal is attenuated sufficiently to avoid interference with a signal transmitted by said second radio transmitting system;

receiving the subtraction signal to form a received signal;

delaying the received signal by 1/f to produce a delayed received signal; and adding a signal opposite in phase to delayed received signal to the received signal.

7. The method as claimed in claim 6, wherein said frequency f is substantially equal to 5 GHz.

8. The method as claimed in claim 6, wherein said delay is provided by a delay circuit.

9. The method as claimed in claim 6, wherein the method using said impulse signal sequence comprises a radio transmitting method using ultrawideband communication.

10. A method for communicating data over a network, comprising:

subjecting data to be transmitted to spectrum spreading modulation processing using a spread code sequence and obtaining a spread signal;

generating an impulse signal corresponding to said spread signal;

delaying said impulse signal by a time equal to a reciprocal of a frequency f of a signal from another radio transmitting apparatus that can cause interference with a transmitted signal;

subjecting the delayed impulse signal and said impulse signal to subtraction processing and producing an output signal;

transmitting the output signal from the subtraction processing such that the frequency f of the transmitted output signal is attenuated sufficiently to avoid interference with a signal transmitted by said second radio transmitting system; and receiving the output signal to form a received signal;

delaying the received signal by 1/f to produce a delayed received signal; and adding a signal opposite in phase to the delayed received signal to the received signal.

11. The radio transmitting apparatus as claimed in claim 1, wherein the another transmitting apparatus is a 5 GHz wireless LAN transmitter and said impulse signal sequence is a radio transmitting apparatus using ultrawideband communication.

* * * * *